No. 621,105. Patented Mar. 14, 1899.
H. LEINEWEBER.
PNEUMATIC TIRE VALVE.
(Application filed Feb. 5, 1898.)
(No Model.)

Witnesses:

Inventor:
Herman Leineweber,
By Dyrenforth & Dyrenforth,
Attys.

UNITED STATES PATENT OFFICE.

HERMAN LEINEWEBER, OF CHICAGO, ILLINOIS.

PNEUMATIC-TIRE VALVE.

SPECIFICATION forming part of Letters Patent No. 621,105, dated March 14, 1899.

Application filed February 5, 1898. Serial No. 669,233. (No model.)

*To all whom it may concern:*

Be it known that I, HERMAN LEINEWEBER, a citizen of the United States, residing at Chicago, in the county of Cook and State of Illinois, have invented a new and useful Improvement in Pneumatic-Tire Valves, of which the following is a specification.

My invention relates to an improvement in the class of valves used with pneumatic tires, through which to inflate them and which serve to hold the air in the tires, which involve in their construction a case fastened in and opening into the tire and externally closed by a screw-cap, and a hollow plug-valve rigidly confined in the case and communicating with the interior thereof, and thus with the tire, through an opening covered by rubber tubing which is expanded by inflation in pumping air into the tire to permit the air to pass it, but which hugs the valve-opening to prevent the egress through it of the air in the tire.

The object of my invention is to provide a valve device in the class referred to of improved construction in matters of detail and which shall enable repair of the valve by renewal of the rubber tubing when worn out (the only feature liable to need repair) to be made quickly and with great convenience.

Figure 1:
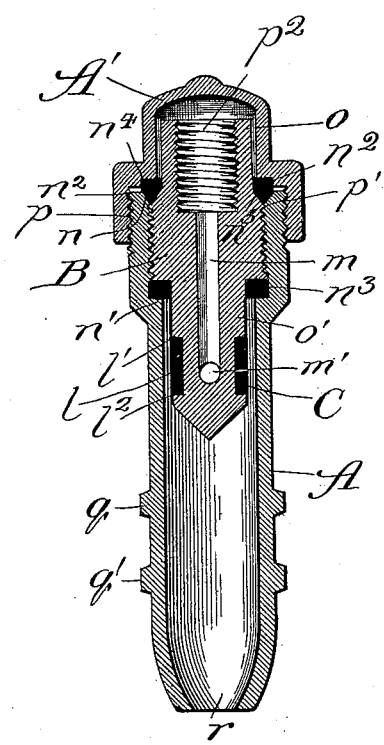
Figure 2:
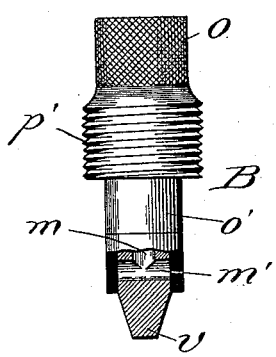
Figure 3:
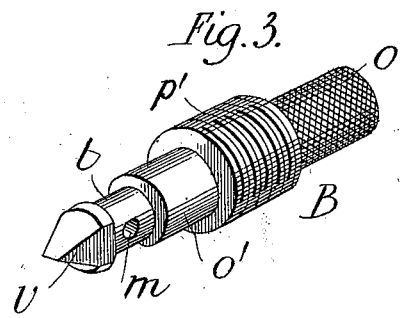

Referring to the accompanying drawings, Figure 1 shows my improved valve device exaggerated as to size by a view in sectional elevation. Fig. 2 is a broken view showing the lower end portion of the valve in side elevation, and Fig. 3 a perspective view of the valve with the rubber tubing forming the valve proper omitted.

A is the valve-casing, which may be of the same general form as the casing of other pneumatic-tire valves. It is shown to be provided near its inner end, which has the opening $r$, with the two circumferential flanges $q$ and $q'$, between which it is confined in the opening made to receive it in the tire. The casing is shown to be expanded toward its outer end, about which it is shown to be provided with an external screw-thread $p$ for screwing the cap A' in place and an internal screw-thread $p'$, into which to screw the head $o$ of the hollow valve B, having an internal screw-thread $p^2$, at which to connect with the valve device the nozzle of an air-pump. The thread $p'$ reaches from an annular shoulder $n$ in the upper end of the valve-casing nearly to a shoulder $n'$ therein, between which latter and the lower end of the head of the valve is confined a washer $n^3$, and a washer $n^2$, V-shaped on its under side to fit at its apex about the top of the line of junction of the head $o$ with the casing, is confined between an annular shoulder $n^4$ in the cap A', the shoulder $n$ in the upper end of the casing and a shoulder $n^5$ about the upper end portion of the valve-head. The shoulders $n$ and $n^5$ are beveled to form the V shape illustrated, thus to conform to the bottom of the washer $n^2$, seated therein.

From the head of the valve extends the narrower neck portion $o'$, containing the passage $m$, which terminates in the openings $m'$ at opposite sides of the neck portion near its lower end, which is preferably of the V shape illustrated, and flattened and beveled, as shown at $v$ of one side in Fig. 2, on the opposite sides corresponding with those containing the openings $m'$.

About the neck of the valve is provided the recess $l$ between rectangular shoulders $l'$ and $l^2$, formed, respectively, at the upper and lower ends of the recess, and in this recess is confined between the shoulders a section of rubber tubing C, forming the valve proper, which fits snugly in place to cover the openings $m'$.

To inflate a pneumatic tire having my improved valve device properly connected with it, the cap A' is removed, when the pump-nozzle is adjusted in the head $o$, and by actuating the pump air is forced through the passage $m$ and openings $m'$, thereby inflating the rubber tubing C and spreading it away from the openings to admit the air into the casing and thence through the opening $r$ therein into the tire. By flattening and beveling the sides of the lower end portion of the valve B the air is better guided past it with the least obstruction from the openings $m'$ into the valve-casing. The shoulders $l'$ and $l^2$ afford adequate means for confining the rubber tubing and closing it at its upper ends without there fastening it in any way, as by binding it with thread. The washer $n^2$ supplements the washer $n^3$ in hermetically sealing the casing A against the egress between it and the valve of air, which cannot escape through the valve B, owing to effective closure of the openings $m'$ from without by the rubber sleeve C.

When the rubber C requires to be renewed, it may be easily removed by taking off the cap A' and withdrawing the valve, when the rubber tubing may be readily torn or slipped off and a new section adjusted in its place by merely slipping it over the inner end of the neck of the valve into the recess $l$.

What I claim as new, and desire to secure by Letters Patent, is—

1. In a pneumatic-tire valve, the combination with the casing provided with a closing-cap on its outer end, of a hollow plug-valve inserted into and withdrawable from the casing at its capped end and having a neck portion flattened and beveled at its lower end and provided with a circumferential recess and containing an air-passage opening through the side of said recessed portion, and rubber tubing confined in said recess to cover said opening, substantially as described.

2. In a pneumatic-tire valve, the combination with the casing provided with a closing-cap on its outer end, of a hollow plug-valve inserted into and withdrawable from the casing at its capped end and having a neck portion V-shaped at its lower end and flattened and beveled on opposite sides of the V-shaped portion, a recess about said neck portion and an air-passage therein opening into said recess at opposite sides, and rubber tubing confined in said recess to cover said openings, substantially as described.

3. A pneumatic-tire valve comprising, in combination, a case A having a cap A' and containing the opening $r$, a hollow plug-valve B removably secured in said casing and having the neck portion $o'$ provided with a recess $l$ and flattened and beveled V-shaped end, a passage $m$ in said neck portion terminating in openings $m'$ leading into said recess, rubber tubing C confined in the recess and washers $n^3$ and $n^2$ confined between shoulders at the opposite ends of the valve-head, substantially as described.

HERMAN LEINEWEBER.

In presence of—
R. T. SPENCER,
DAN W. LEE.